(12) United States Patent  
Qian et al.

(10) Patent No.: US 7,043,071 B2
(45) Date of Patent: May 9, 2006

(54) SOFT DEFECT PRINTABILITY SIMULATION AND ANALYSIS FOR MASKS

(75) Inventors: Qi-De Qian, Santa Clara, CA (US); Linyong Pang, Castro Valley, CA (US)

(73) Assignee: Synopsys, Inc., Mountain View, CA (US)

( * ) Notice: Subject to any disclaimer, the term of this patent is extended or adjusted under 35 U.S.C. 154(b) by 762 days.

(21) Appl. No.: 10/243,629

(22) Filed: Sep. 13, 2002
(Under 37 CFR 1.47)

(65) Prior Publication Data

US 2004/0052411 A1    Mar. 18, 2004

(51) Int. Cl.
G06K 9/00    (2006.01)
G06F 17/50    (2006.01)

(52) U.S. Cl. .......................................... 382/144; 716/4
(58) Field of Classification Search ................ None
See application file for complete search history.

(56) References Cited

U.S. PATENT DOCUMENTS

| | | | |
|---|---|---|---|
| 5,282,140 A | 1/1994 | Tazawa et al. ............. 364/468 |
| 5,326,659 A | 7/1994 | Liu et al. ....................... 430/5 |
| 5,563,702 A * | 10/1996 | Emery et al. ................. 356/73 |
| 5,572,598 A | 11/1996 | Wihl et al. ................. 382/144 |
| 5,795,685 A * | 8/1998 | Liebmann et al. ............. 430/5 |
| 5,795,688 A * | 8/1998 | Burdorf et al. ............. 430/30 |
| 5,804,340 A | 9/1998 | Garza et al. .................. 430/5 |
| 5,849,440 A | 12/1998 | Lucase et al. ................. 430/5 |
| 5,965,306 A * | 10/1999 | Mansfield et al. ........... 430/22 |
| 6,016,357 A * | 1/2000 | Neary et al. ............... 382/144 |
| 6,023,328 A | 2/2000 | Pierrat ..................... 356/237.4 |
| 6,076,465 A | 6/2000 | Vacca et al. ................ 101/481 |
| 6,078,738 A | 6/2000 | Garza et al. ........... 395/500.22 |
| 6,091,845 A * | 7/2000 | Pierrat et al. .............. 382/144 |
| 6,130,750 A | 10/2000 | Ausschnitt et al. ......... 356/401 |
| 6,171,731 B1 | 1/2001 | Medvedeva et al. ............ 430/5 |
| 6,225,025 B1 | 5/2001 | Hoshino ..................... 430/296 |
| 6,272,236 B1 | 8/2001 | Pierrat et al. .............. 382/144 |
| 6,334,209 B1 | 12/2001 | Hashimoto et al. ........... 716/21 |

(Continued)

FOREIGN PATENT DOCUMENTS

WO    WO 97/13370 A1    4/1997

(Continued)

OTHER PUBLICATIONS

Spence, C., et al., "Detection of 60(degree) Phase Defects on Alternating PSMs", Advanced Micro Devices, KLA-Tencor. DuPont RTC (2 pages).

(Continued)

Primary Examiner—Wenpeng Chen
Assistant Examiner—Utpal Shah
(74) Attorney, Agent, or Firm—Bever, Hoffman & Harms, LLP; Jeanette S. Harms (57) ABSTRACT

Masks that include optical proximity correction or phase shifting regions are increasingly being used in the manufacturing process. These masks, either initially or after repair, can have "soft" defects, e.g. phase and/or transmission defects. In accordance with one feature of the invention, soft defect information can be computed from standard test images of a mask. This soft defect information can be used to generate an accurate simulated wafer image, thereby providing valuable defect impact information to a user. Knowing the impact of the soft defect can enable a user to make better decisions regarding the mask. Specifically, a user can now with confidence accept the mask for the desired lithographic process, repair the mask at certain critical locations, or reject the mask, all without exposing a wafer.

18 Claims, 6 Drawing Sheets

U.S. PATENT DOCUMENTS

| | | | |
|---|---|---|---|
| 6,339,836 B1 | 1/2002 | Eisenhofer et al. | 716/5 |
| 6,346,426 B1 | 2/2002 | Toprac et al. | 438/8 |
| 6,526,164 B1* | 2/2003 | Mansfield et al. | 382/144 |
| 6,578,188 B1* | 6/2003 | Pang et al. | 716/19 |
| 6,727,512 B1* | 4/2004 | Stokowski et al. | 250/559.45 |
| 2002/0019729 A1 | 2/2002 | Chang et al. | 703/6 |
| 2002/0035461 A1 | 3/2002 | Chang et al. | 703/13 |

FOREIGN PATENT DOCUMENTS

| | | |
|---|---|---|
| WO | WO 98/20327 A1 | 5/1998 |
| WO | WO 98/45685 A1 | 10/1998 |
| WO | WO 99/14706 A2 | 3/1999 |
| WO | WO 99/14706 A3 | 3/1999 |
| WO | WO 99/38002 A1 | 7/1999 |
| WO | WO 99/56113 A1 | 11/1999 |
| WO | WO 99/59200 A1 | 11/1999 |
| WO | WO 99/67626 A1 | 12/1999 |
| WO | WO 00/36525 A2 | 6/2000 |

OTHER PUBLICATIONS

Stirniman, J., et al., "Spatial Filter Models to Describe IC Lithographic Behavior", Precim Corporation. Portland, Oregon (10 pages).

Sugawara, M., et al., "Defect Printability Study of Attenuated Phase-Shifting Masks for Specifying Inspection Sensitivity", Sony Corporation. Kanagawa, Japan (16 pages).

Cobb, et al., "Fast Sparse Aerial Image Calculation for OPC", SPIE. vol. 2621, pp. 534-544, Sep. 20-22, 1995.

Ogawa, K., et al., "Phase Defect Inspection by Differential Interference", Lasertec Corporation (12 pages).

Kang, D., et al., "Effects of Mask Bias on t he Mask Error Enhancement Factor (MEEF) of Contact Holes" (11 pages).

Socha, R., et al., "Printability of Phase-Shift Defects Using a Perturbational Model", Univ. of California Berkeley, Sematech (11 pages).

Adam, K., et al., "Simplified Models for Edge Transitions in Rigorous Mask Modeling", University of California Berkeley (40 pages).

Gordon, R., et al., "Mask Topography Simulation for EUV Lithography", FINLE Technologies Inc. (15 pages).

Pistor, T., "Rigorous 3D Simulation of Phase Defects in Alternating Phase-Shifting Masks", Panoramic Technology Inc. (13 pages).

Semmier, A., et al., "Application of 3D EMF Simulation for Development and Optimization of Alternating Phase Shifting Masks", Infineon Technologies AG (12 pages).

Erdmann, A., "Topography Effects and Wave Aberrations in Advanced PSM-Technology", Fraunhofer Institute of Integrated Circuits (11 pages).

Fiekowsky, P., "The End of Thresholds: Subwavelength Optical Linewidth Measurement Using the Flux-Area Technique", Automated Visual Inspection (6 pages).

Neureuther, A., et al., "Modeling Defect-Feature Interactions in the Presence of Aberrations", University of California Berkeley (10 pages).

Mathur, B.P., et al., "Quantitative Evaluation of Shape of Image on Photoresist of Square Apertures", IEEE, Transactions On Electron Devices, vol. 35, No. 3, pp. 294-297, Mar. 1988.

Neureuther, A., "Modeling Phase Shifting Masks", SPIE, 10th Annual Symposium On Microlithography, vol. 1496, pp. 80-85 (1990).

Wiley, J., et al., "Phase Shift Mask Pattern Accuracy Requirements and Inspection Technology", SPIE., Integrated Circuit Metrology, Inspection, And Process Control V, vol. 1464, pp. 346-355 (1991).

Watanabe, H., et al., "Detection and Printability of Shifter Defects in Phase-Shifting Masks", Japanese Journal of Applied Physics, vol. 30, No. 11B, pp. 3016-3020, Nov. 1991.

Watanabe, H., et al., "Detection and Printability of Shifter Defects in Phase-Shifting Masks II Defocus Characteristics", Jpn. J. Appl. Phys., vol. 31, pp. 4155-4160 (1992).

Crisalle, O., et al., "A Comparison of the Optical Projection Lithography Simulators in Sample and Prolith". IEEE. Transactions On Semiconductor Manufacturing, vol. 5, No. 1, pp. 14-26, Feb. 1992.

Hosono, K., et al., "A Novel Architecture for High Speed Dual Image Generation of Pattern Data for Phase Shifting Reticle Inspection", SPIE—Integrated Circuit Metrology, Inspection, and Process Control VI. vol. 1673. pp. 229-235 (1992).

Lin, B.J., et al., "Single-Level Electric Testsites for Phase-Shifting Masks". SPIE. vol. 1673, pp. 221-228, Mar. 9-11, 1992.

Rieger, M., et al., "System for Lithography Proximity Compensation", Precim Company, Portland, Oregon, Sep. 1993 (28 pages).

Wiley, J., et al., "Device Yield and Reliability by Specification of Mask Defects", Solid State Technology, vol. 36, No. 7, pp. 65-66, 70, 72, 74, 77, Jul. 1993.

Ohtsuka, II., et al., "Evaluation of Repair Phase and Size Tolerance for a Phase-Shift Mask", J. Vac. Sci. Technol. B, vol. 11, No. 6, pp. 2665-2668, Nov./Dec. 1993.

Pati, Y.C., et al., "Phase-Shifting Masks for Microlithography: Automated Design and Mask Requirements", J. Opt. Soc. Am., vol. 11, No. 9, pp. 2438-2452, Sep. 1994.

Spence, C., et al., "Automated Determination of CAD Layout Failures Through Focus: Experiment and Simulation". SPIE. vol. 2197, pp. 302-313 (1994).

Qian, Q.D., et al., "A New Sealar Planewave Model for High NA Lithography Simulations", IEEE, pp. 45-48 (1994).

Karklin, L., "A Comprehensive Simulation Study of the Photomask Defects Printability", SPIE, vol. 2621, pp. 490-504 (1995).

Wiley, J., et al., "The Effect of Off-Axis Illumination on the Printability of Opaque and Transparent Reticle Defects", SPIE, vol. 2512, pp. 432-440 (1995).

Reynolds, J., "Elusive Mask Defects: Reflectivity Variations", Solid State Technology, pp. 75-76, Mar. 1995.

Brunner, T., et al., "Approximate Models for Resist Processing Effects", SPIE, vol. 2726, pp. 198-207, Mar. 1996.

Kusunose, H., et al., "Direct Phase-Shift Measurement with Transmitted Deep-UV Illumination", SPIE, vol. 2793, pp. 251-260 (1996).

Chang, K., et al., "Accurate Modeling of Deep Submicron Interconnect Technology", TMA Times, vol. IX, No. 3 (1997).

Pati, Y.C., et al., "Exploiting Structure in Fast Aerial Image Computation for Integrated Circuit Patterns", IEEE Transactions On Semiconductor Manufacturing, vol. 10, No. 1, pp. 62-74, Feb. 1997.

Vacca, A., et al., "100nm Defect Detection Using a Dynamically Programmable Image Processing Algorithm", SPIE. vol. 3236 (1997) (Abstract Only).

Brunner, T., "Impact of Lens Aberrations on Optical Lithography", IBM J. Res. Develop., vol. 41, No. 1/2. pp. 57-67, Jan./Mar. 1997.

Tsujimoto, E., et al., "Hierarchical Mask Data Design System (PHOPHET) for Aerial Image Simulation, Automatic Phase-Shifter Placement, and Subpeak Overlap Checking", SPIE. vol. 3096, pp. 163-172 (1997).

Schoenmaker, W., et al., "Theory and Implementation of a New Interpolation Method Based on Random Sampling", IMEC Technology Paper, pp. 1-35, Jan. 31, 1997.

Kubota, H., et al:, "A Fast Method of Simulating Resist Pattern Contours Based on Mean Inhibitor Concentration", Jpn. J. Appl. Phys., vol. 37, pp. 5815-5820 (1998).

Vacca, A., et al., "100nm Defect Detection Using an Existing Image Acquisition System", SPIE, vol. 3236, pp. 208-221 (1998).

Cobb, N., "Fast Optical and Process Proximity Correction Algorithms for Integrated Circuit Manufacturing", Dissertation, University of California at Berkeley, UMI Microform 9902038 (139 pages).

Fukuda, H., et al., "Determination of High-Order Lens Aberration Using Phase/Amplitude Linear Algebra", J. Vac. Sci. Technol. B. vol. 17, No. 6, pp. 3318-3321, Nov./Dec. 1999.

Balasinski, A., et al., "A Novel Approach to Simulate the Effect of Optical Proximity on MOSFET Parametric Yield", IEEE, pp. 37.6.1-37.6.4 (1999).

Balasinski, A., et al., "Comparison of Mask Writing Tools and Mask Simulations for 0.16um Devices", IEEE, SEMI Advanced Semiconductor Manufacturing Conference, pp. 372-377 (1999).

Fickowsky, P., et al., "Defect Printability Measurement on the KLA-351: Correlation to Defect Sizing Using the AVI Metrology System", SPIE 19th Annual BACUS Symposium on Photomask Technology and Management Conference, pp. 1-6, Sep.

Tejnil, E., et al., "Option for At-Wavelength Inspection of Patterned Extreme Ultraviolet Lithography Masks", SPIE Bacus '99, pp. 1-12 (1999).

Uhring, W., et al., "Model of an Instrumented Opto-Electronic Transmission System in HDL-A and VHDL-AMS", SPIE, vol. 3893, pp. 137-146, Oct. 1999.

Hemar, S., et al., "Finding Killer CD Variations by Full-Reticle CD Mapping", Microlithography World, pp. 4, 6, 8 & 10 (Summer 2000).

Granik, Y., et al., "Sub-Resolution Process Windows And Yield Estimation Technique Based On Detailed Full-Chip CD Simulation", SPIE, vol. 4182, pp. 335-341 (2000).

Adam, K., "Domain Decomposition Methods For The Electromagnetic Simulation Of Scattering From Three-Dimensional Structures With Applications In Lithography", University of California Berkeley, College of Engineering, Electronics Research.

Bowman, B., et al., "Impact of Die-to-Die and Within-Die Parameter Fluctuations on the Maximum Clock Frequency Distribution for Gigascale Integration", IEEE Journal of Solid-State Circuits, vol. 37, No. 2, pp. 183-190, Feb. 2, 2002.

Chiou, S.Y., et al., "Implementing Simulation-Based Mask-Qulaification Technology", MICRO, Feb. 2002 (10 pages).

* cited by examiner

SOFT DEFECT PRINTABILITY SIMULATION AND ANALYSIS FOR MASKS

BACKGROUND OF THE INVENTION

1. Field of the Invention

This invention relates to the field of integrated circuit manufacturing, and in particular to a method for obtaining soft, e.g. phase or transmission, defect information from masks used in the manufacture of integrated circuits. This information can be used to determine the impact of such soft defects on wafer printability.

2. Description of Related Art

In designing an integrated circuit (IC), engineers can use computer simulation tools to help create a circuit design. The circuit design consists of individual devices coupled together to provide certain functions. To fabricate this circuit in a semiconductor substrate on a wafer, the circuit design is translated into a layout. Computer aided design (CAD) tools can assist layout designers in the task of translating the discrete circuit elements (such as gate electrodes, field oxidation regions, diffusion regions, metal interconnections, etc.) into shapes in the layout that implement these circuit elements.

The layout can be transferred onto the semiconductor substrate using optical lithography. Specifically, for each layer of the circuit design, a radiation (e.g. light) source is shone on a mask (or reticle) corresponding to that layer. This radiation passes through clear regions of the mask and is blocked by opaque regions of the mask, thereby selectively exposing a photoresist layer on the wafer. The exposed photoresist layer can then be developed and the semiconductor layer underlying the photoresist can be etched, thereby creating a pattern that defines the shapes of that layer. This process can be repeated for each layer of the circuit design.

One type of mask used in this process, called a binary mask, can be used for less complicated and dense ICs. In more complicated and dense ICs, a binary mask may also include optical proximity correction (OPC) features. Optical proximity correction (OPC) applies systematic changes to the layout to improve the printability of a wafer pattern. Specifically, as the size of IC features drops to 0.18 μ and below, the features can become smaller than the wavelength of the light used to create such features, thereby creating optical distortions when printing the features onto the wafer. These optical distortions can represent significant impacts on device performance.

OPC can include rules to implement certain changes to the layout, thereby compensating for some optical distortions. For example, to compensate for line-end shortening, OPC can add a hammerhead to a line end. Additionally, to compensate for corner rounding, OPC can add (or subtract) serif shapes from outer (or inner) corners. These changes can form features on the wafer that are closer to the original intended layout.

Another advance in lithography, called phase shifting, is able to generate features on the wafer that are smaller than the corresponding wavelength of the exposure radiation. These ultra-small features are generated by the interference of light in adjacent, complementary pairs of phase shifters having opposite phase, e.g. 0 and 180 degrees. In the phase shifting mask (PSM), the complementary phase shifters (also called shifters herein) are configured such that the exposure radiation transmitted by one shifter is 180 degrees out of phase with the exposure radiation transmitted by the other shifter. Therefore, rather than constructively interfering and merging into a single image, the projected images destructively interfere where their edges overlap, thereby creating a clear and very narrow image between the shifters. In one embodiment, the PSM can be used in conjunction with a trim mask, wherein the trim mask can protect the areas exposed by the PSM as well as define other features of the layout. Hence, a lithographic process using a PSM is called a double exposure process.

As circuit designs become more complicated, it becomes increasingly important that the masks used in photolithography can accurately transfer the layout to the wafer. Unfortunately, the machines used to manufacture these masks cannot do so without error. In fact, in a typical manufacturing process, some mask defects do occur outside the controlled process.

A defect on a mask is anything that is different from the circuit design and is deemed unacceptable by an inspection tool or an inspection engineer. The inspection can include scanning the surface of the mask with a high-resolution microscope (e.g. an optical microscope) and capturing images of the mask. If there are no defects, or defects are detected but determined to be within tolerances set by the manufacturer or end-user, then the mask can be used to expose a wafer. However, if defects are detected that fall outside tolerances, then the mask fails the inspection, and a decision must be made as to whether the mask may be cleaned and/or repaired to correct the defects, or whether the defects are so severe that a new mask must be manufactured. This process is continued until a manufactured mask passes the inspection.

However, not all mask defects are important with respect to the desired end result, i.e. an accurate transfer of the layout to the photoresist, which in turn can be etched into a layer of the wafer. In other words, not all mask defects will adversely impact the outcome of a given photolithography and/or etching process. One conventional way to determine the impact of a defect includes exposing an actual wafer. However, a wafer exposure incurs significant costs in time, money, and resource management.

Some currently available tools can advantageously eliminate the need for wafer exposures by using advanced simulation techniques. For example, the Virtual Stepper® system, a mask qualification tool licensed by Numerical Technologies, Inc., can use the optical images generated from an inspection tool to create a simulated image of the final wafer pattern. To perform the simulation, the Virtual Stepper system can use process modeling in which the imaging system wavelength, numerical aperture, coherence factor, illumination modes, reduction factors, and lens aberrations can be considered. Using the simulated wafer image, the Virtual Stepper system can check mask quality and analyze the severity of most mask defects.

Figure 1A:
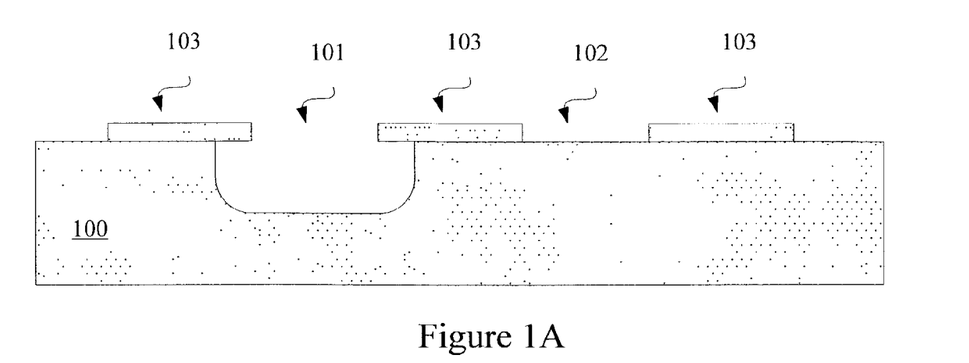
FIG. 1A illustrates a cross section of a complementary pair of defect-free phase shifters including a 180 degree phase shifter and a 0 degree phase shifter.
Figure 1B:
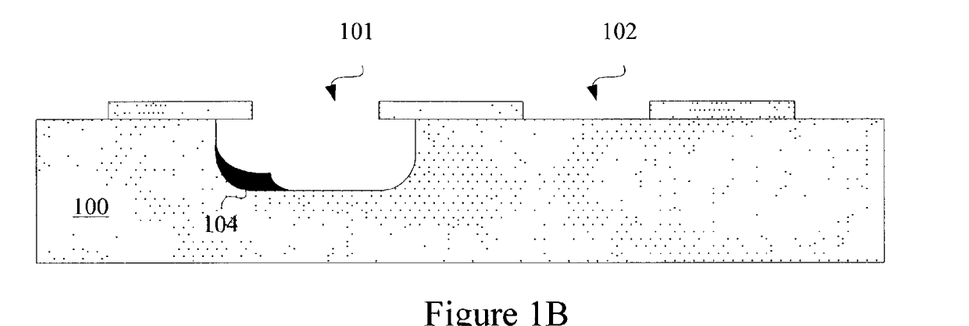
FIG. 1B illustrates the complementary pair of phase shifters in FIG. 1A, but including a phase defect in the 180 degree shifter.
Figure 1C:
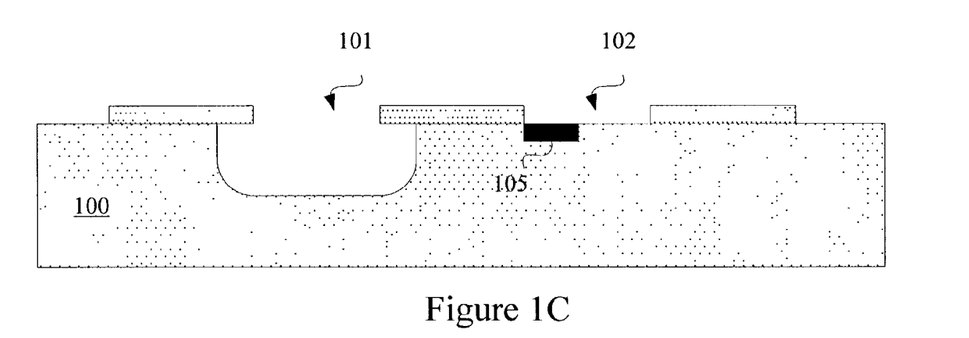
FIG. 1C illustrates the complementary pair of phase shifters in FIG. 1A, but including a phase defect in the 0 degree shifter.

However, "soft" defects, e.g. phase and/or transmission defects, on a mask pose unique challenges in both their identification as well as assessing their impact on the printability of the wafer. For example, FIG. 1A illustrates a cross section of a complementary pair of defect-free phase shifters including a 180 degree phase shifter 101 and a 0 degree phase shifter 102. Both shifters are defined by openings provided in a chrome layer 103 formed on a quartz substrate 100. In one embodiment, shifter 101 is formed by performing a 65 degree dry etch in substrate 100 followed by a 115 degree wet etch, thereby providing the desired 180 degree phase shift (i.e. 65+115=180). Note that the dry etch provides a vertical (i.e. an anisotropic) etch into substrate 100, whereas the wet etch provides both a horizontal and vertical (i.e. an isotropic) etch into substrate 100, thereby ensuring that the edges of shifter 101 are under chrome layer 103 to prevent intensity loss. Shifter 102 has no associated etching of substrate 100, thereby providing the desired 0 degree phase shift. FIG. 1B illustrates the complementary pair of phase shifters in FIG. 1A, but including a phase defect 104 in the 180 degree shifter 101. In contrast, FIG. 1C illustrates the complementary pair of phase shifters in FIG. 1A, but including a phase defect 105 in the 0 degree shifter 102.

Identifying the phase of phase defects 104 and 105 could be determined by measuring their physical dimensions. Specifically, by using an extremely accurate measurement tool, such as an atomic force microscope (AFM), the width, length, and depth of each defect could be measured. Using these dimensions as well as the physical properties of substrate 100, e.g. its refractive index, the phase of phase defects 104 and 105 could be computed. Unfortunately, the use of such a measurement tool in a commercial environment is prohibitively expensive.

Therefore, a need arises for a technique to accurately identify soft defects on a mask in a cost effective manner. Moreover, once this soft defect can be identified, a further need arises for a technique to determine the severity of those soft defects on wafer printability.

SUMMARY OF THE INVENTION

As circuit density and complexity continue to increase, masks including cutting edge technology, such as binary masks including optical proximity correction (OPC) and phase shifting masks (PSMs), are being used more often in the manufacturing process. These masks, either initially or after repair, can have "soft" defects, e.g. phase and/or transmission defects. Unfortunately, tools currently used in the industry cannot automatically identify, much less determine the impact of these soft defects.

In accordance with one feature of the invention, soft defect information can be computed from standard test images of a mask. This soft defect information can be used to generate an accurate simulated wafer image, thereby providing valuable defect impact information to a user. Knowing the impact of the soft defect can enable a user to make better decisions regarding the mask. Specifically, a user can now with confidence accept the mask for the desired lithographic process, repair the mask at certain critical locations, or reject the mask, all without exposing a wafer. Because the impact of the soft defects is known, the number of defects that need to be repaired can be reduced, thereby saving considerable time during this operation. Phase defect identification and severity determination can implemented as a software tool running on a computer, thereby minimizing additional system cost.

In one embodiment, in addition to a test image including a soft defect, a reference image is also obtained. The reference image, which can be rendered from a database or obtained from another die on the wafer, provides a defect-free image of the test image. A defect image can be generated by subtracting the reference image from the test image. A host image can be generated by subtracting the defect image from the reference image.

At this point, a transmission, a phase, and a shape for both the host image and the defect image can be computed. Note that the defect and host images are analyzed separately because their respective transmission and phase information are obtained using different processes. However, once this information is obtained, the defect and host images can be combined to generate a corrected test image. Transmission, phase, and shape information can also be computed for the reference image, thereby generating a corrected reference image. Using the corrected test image and the corrected reference image, a simulated test wafer image based on the corrected test image and a simulated reference wafer image based on the corrected reference image can be generated. In one embodiment, a trim mask image can be used in generating the simulated test wafer image and the simulated reference wafer image, thereby simulating the second exposure in double exposure phase shifting mask technology. In general, a supplemental mask image can be used in generating the simulated test wafer image and the simulated reference wafer image, thereby simulating another exposure in a multiple exposure phase shifting mask technology. In another embodiment, because the stepper (i.e. the tool transferring the mask pattern to the wafer) and the inspection tool (i.e. the tool generating the test image) may have different optical settings, the transmission and the phase of the defect, host, and reference images can be calibrated, thereby improving the computed transmission for these images.

In one embodiment, computing the shape of the defect can include using diffraction compensation to correct for optical distortions in the defect image. Computing the phase of the defect can include using multiple defect images, each defect image taken at a different defocus. Computing the transmission of the defect can include determining the transmission of an area immediately surrounding the defect using the test image and assigning the defect that transmission.

In one embodiment, computing the shape of the host image can also include using diffraction compensation to correct for optical distortions in the host image. Computing the transmission of the host image can include using a lookup table including gray scale intensities. Computing the phase of the host image can include looking at the intensity changing trend at the boundary of the host image. Locations of high intensities can be identified. Bumps at those locations indicate a 180 degree phase and no bumps at those locations indicate a 0 degree phase.

In one embodiment, computing the shape of the reference image can include using diffraction compensation to correct for optical distortions in the reference image. The transmission of one or more shifters can be derived from a gray scale of the reference image. The transmission coefficient of various transmission areas can be obtained from a lookup table, which stores the gray scale information. An approximate phase of each high transmission area can also be derived from the gray scale. Specifically, a gray scale of the reference image can be plotted along a cut line, wherein high intensity areas with/without bumps can identify the phase (i.e. 180/0 degrees) of each shifter.

A phase shifting mask can include a plurality of pairs of phase shifters. Specifically, each pair of shifters is configured such that light transmitted by a first phase shifter is 180 degrees out of phase with light transmitted by a second phase shifter. In accordance with one feature of the invention, at least one phase shifter on the mask includes a phase defect identified, but determined to be acceptable based on a simulated wafer image of the phase defect. The phase shifting mask can be an alternating phase shifting mask, an attenuated phase shifting mask, or a tri-tone attenuated phase shifting mask

DETAILED DESCRIPTION OF THE FIGURES

In accordance with one feature of the invention, the phase, transmission, and size of a defect on a mask can be accurately and cost effectively obtained from standard optical images. A simulation tool receiving this information can then simulate a wafer image of the phase defects, thereby indicating the impact of such phase defects. The simulation tool can also advantageously determine the severity of the impact. In this manner, the number of defects that need to be repaired on the mask can be reduced, thereby optimizing manufacturing resources.

Figure 2A:
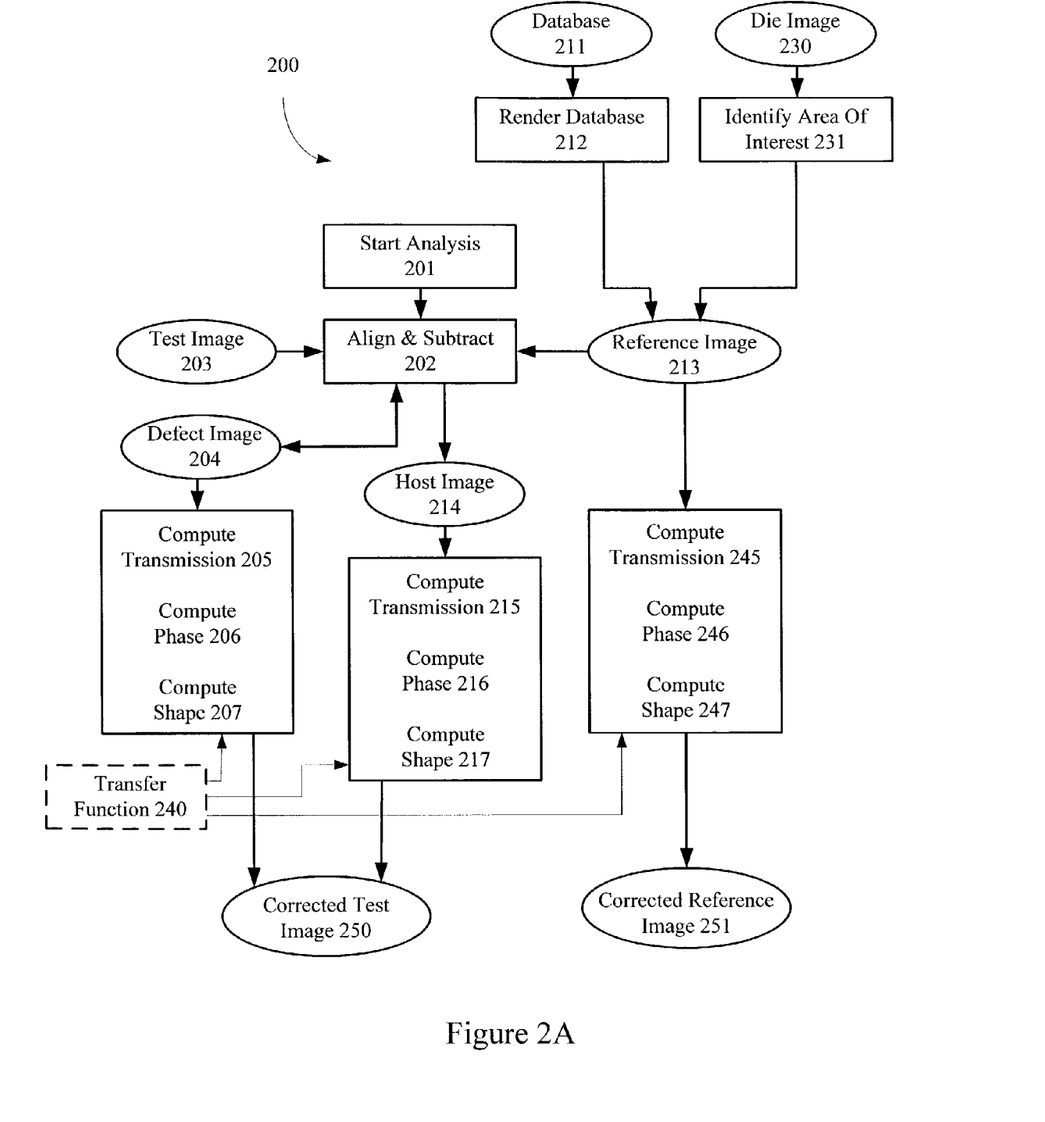
FIGS. 2A and 2B illustrate a flow chart indicating exemplary data and steps associated with analyzing soft defects on a mask.
Figure 2B:
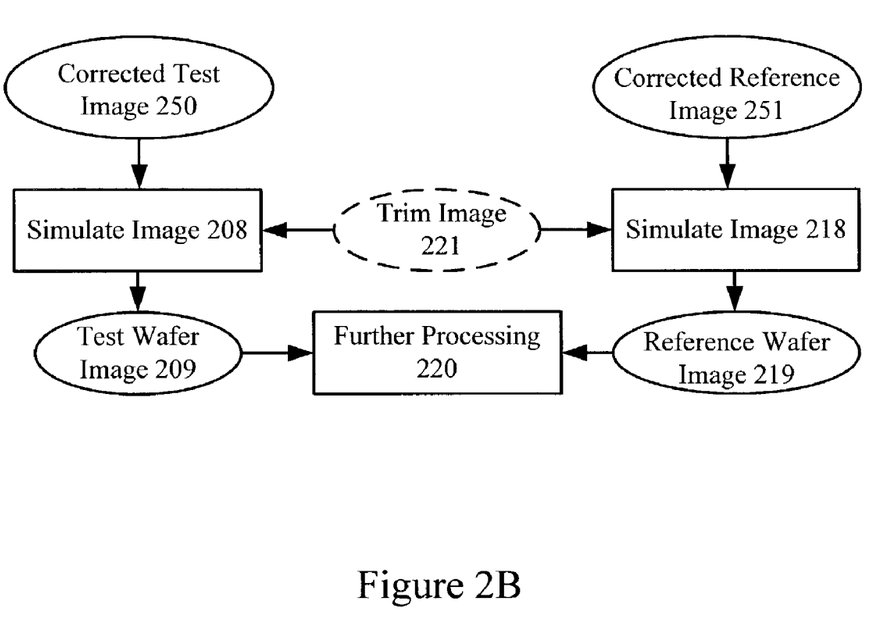

FIGS. 2A and 2B illustrate a flow chart 200 indicating exemplary data and steps associated with analyzing phase defects on a mask. Note that rectangles in flow chart 200 refer to steps whereas ellipses refer to data. The process illustrated by flow chart 200 starts in step 201.

A mask inspection tool, such as the MD3000™ device sold by Lasertec Corporation or the SLF27™ system sold by KLA-Tencor Corporation, can detect a phase defect within a predefined area of the mask by comparing its generated optical image (obtained by using reflected from or transmitted light through the mask) (called a test image 203 herein) with a reference optical image (simply called a reference image 213 herein). The reference image represents a defect-free image at the same location as the test image.

In one embodiment, reference image 213 can be rendered from a database 211 in step 212. Specifically, the data in database 211 associated with the location of interest can be converted (e.g. from GDS-II or other format or other database) into an optical image using a simulation tool. In this case, the simulation tool can simulate the optics used by the mask inspection tool to generate reference image 213.

In another embodiment, reference image 213 can be obtained using a die image 230. Specifically, when database 211 is unavailable, die-to-die information can be used. Because the probability of finding a defect in two dies in the same location (which can be identified in step 231) is very low, information from another die on the mask can be used to provide reference image 213. In this case, reference image 213 can be identified with the same inspection tool used to identify test image 203. Note that in a die-to-die case, the image obtained from the die not including the defect can be characterized as the reference image, whereas the image obtained from the die including the defect can be characterized as the test image. This characterization can be provided by step 202.

In step 202, test image 203 and reference image 213 can be aligned. Once aligned, reference image 213 can be subtracted from test image 203, thereby generating a defect image 204. Note that if no defect is present, then defect image 204 would have no element(s). To perform analysis on mask features other than any defect(s) in defect image 204, defect image 204 can be subtracted from test image 203, thereby generating a host image 214. Host image 214 is generated because the computation of transmission and phase (described below) can differ for the defect image and the host image.

Figure 3A:
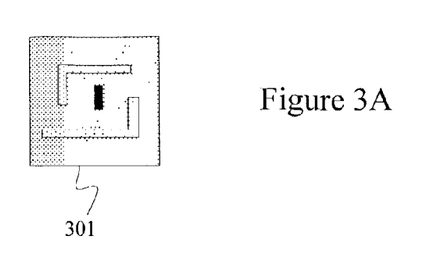
FIG. 3A illustrates a test image that has been captured by a test tool.
Figure 3B:
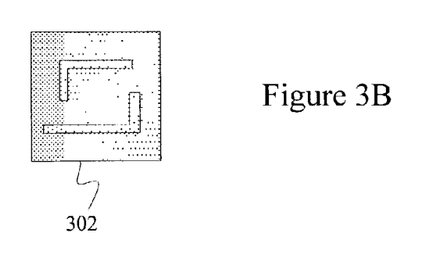
FIG. 3B illustrate a reference image that represents a defect-free image of the same area shown in the test image of FIG. 3A.
Figure 3C:
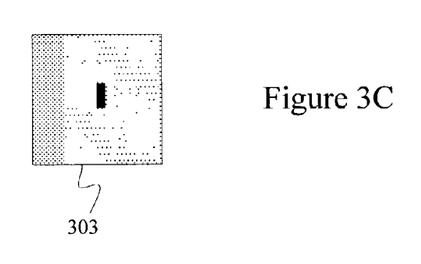
FIG. 3C illustrates a defect image that can be generated after subtracting the reference image of FIG. 3B from the test image of FIG. 3A.
Figure 3D:
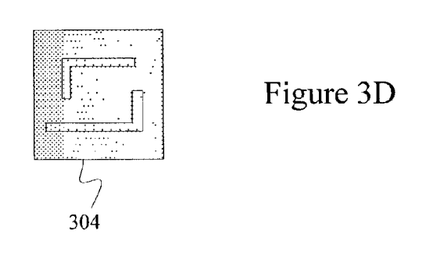
FIG. 3D illustrates a host image that can be generated after subtracting the defect image of FIG. 3C from the test image of FIG. 3A.

FIGS. 3A–3D illustrate examples of test, reference, defect, and host images. For example, FIG. 3A could illustrate a test image 301, which has been captured by an inspection tool analyzing an area of a mask designated as having a defect. FIG. 3B could illustrate a reference image 302, which represents a defect-free image of the same area. After being aligned, subtracting reference image 302 from test image 301 yields a defect image 303, as shown in FIG. 3C. At this point, defect image 303 could also be aligned with and then subtracted from test image 301 to generate a host image 304, as shown in FIG. 3D.

Figure 3E:
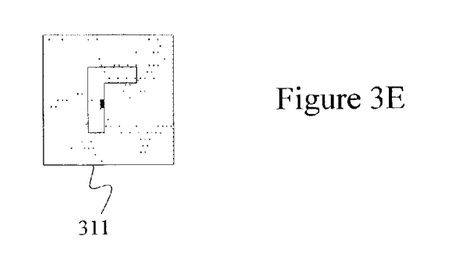
FIG. 3E illustrates another test image that has been captured by a test tool.
Figure 3F:
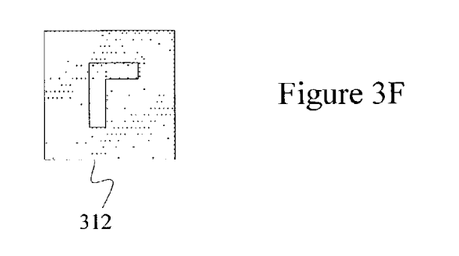
FIG. 3F illustrate a reference image that represents a defect-free image of the same area shown in the test image of FIG. 3E.
Figure 3G:
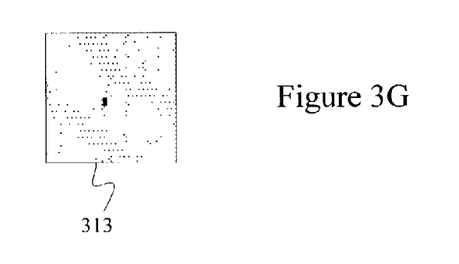
FIG. 3G illustrates a defect image that can be generated after subtracting the reference image of FIG. 3F from the test image of FIG. 3E.
Figure 3H:
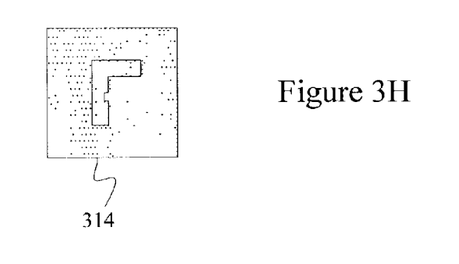
FIG. 3H illustrates a host image that can be generated after subtracting the defect image of FIG. 3G from the test image of FIG. 3E.

Note that the host image is not necessarily identical to the reference image. For example, FIG. 3E could illustrate a test image 311, which has been captured by an inspection tool analyzing an area of a mask designated as having a defect. However, this defect, instead of being separate from the features on the mask, is formed in one of the features. FIG. 3F could illustrate a reference image 312, which represents a defect-free image of the same area. After being aligned, subtracting reference image 312 from test image 311 yields a defect image 313, as shown in FIG. 3G. At this point, defect image 313 could also be aligned with and then subtracted from test image 311 to generate a host image 314, as shown in FIG. 3H. Thus, where the defect is formed in a feature, the host image is not identical to the reference image.

Analyzing the Host Image

In accordance with one feature of the invention, the transmission (i.e. the intensity transmission coefficient), phase, and shape of the shifters in host image 214 can be computed in steps 215, 216, and 217, respectively. These steps are independent from each other and therefore can be done in any order. Note that in cases in which reference image 213 and host image 214 are identical, the transmission, phase, and shape information for host image 214 can be provided by database 211, assuming information from database 211 is available. For purposes of illustration herein, information from database 211 is assumed to be unavailable, thereby necessitating the derivation of transmission, phase, and shape information from host image 214.

Figure 4A:
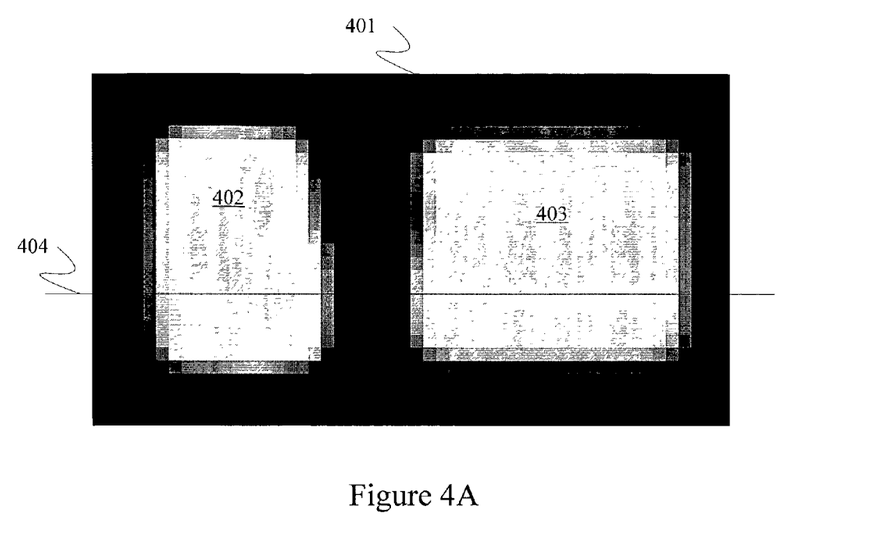
FIG. 4A illustrates an exemplary reference image, which includes two high transmission areas (i.e. shifters) in a low transmission plane. The transmission coefficient of the high transmission areas can be obtained from a lookup table that stores gray scale information.

In one embodiment, the transmission of one or more shifters can be derived from a gray scale of host image 214. A gray scale includes multi-intensity levels (e.g. 256 intensity gradations from 0 (i.e. black that represents the lowest transmission) to 255 (i.e. white that represents the highest transmission). FIG. 4A illustrates a simplified reference image 401, which indicates two high transmission areas 402 and 403 in a low transmission plane. High transmission areas 402 and 403 represent complementary phase shifters. In one embodiment, the transmission coefficient of high transmission areas 402 and 403 can be obtained from a lookup table, which stores the gray scale information.

Figure 4B:
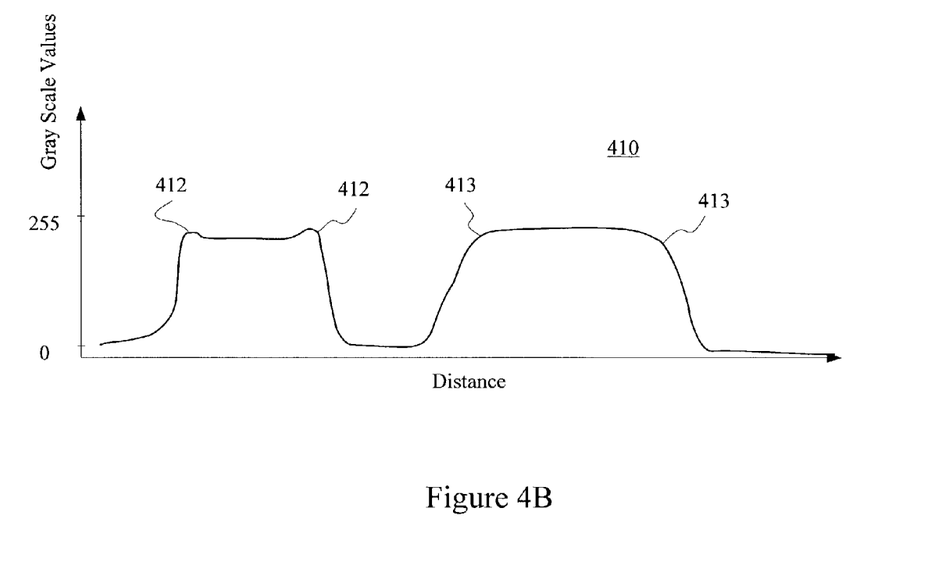
FIG. 4B illustrates a graph of gray scale intensities along a cut line in the reference image of FIG. 4A. Locations of high intensities on the graph can indicate an approximate phase of a shifter. Specifically, bumps at corners of the locations indicate a 180 degree phase and no bumps at the corners of the locations indicate a 0 degree phase.

In accordance with one feature of the invention, an approximate phase of each of high transmission areas 402 and 403 can also be derived from the gray scale. Specifically, a gray scale of reference image 401 can be plotted along a cut line (e.g. cut line 404 in FIG. 4A). In graph 410 of FIG. 4B, corners 412 and 413 can distinguish the 0 degree shifter from the 180 degree shifter. Specifically, corners 412 (which correspond to the edges of high transmission area 402) have "bumps" or protrusions compared to corners 413 (which correspond to the edges of high transmission area 403). These bumps indicate an interference that occurs between a 180 degree phase region and the chrome. Although the size and/or shape of the bumps can vary between mask processes, the 0 degree phase regions will not exhibit these bumps. Thus, by using the gray scale of the host image, the approximate phase (i.e. 0 degrees or 180 degrees) of each shifter can be assigned. Note that the size and/or shape of corners 412 and 413 could indicate some additional information regarding the exact phase of the shifters (e.g. whether the shifter is 7 degrees versus 0 degrees etc.). However, for analyzing host image 214 (FIG. 2), an assignment of either 0 or 180 degrees is sufficient.

The shape of the shifters on the host image can be computed using diffraction compensation. Specifically, the inspection optics act as a function F on a mask feature, wherein the function F generates the host image. Therefore, an inverse function F' and the host image can be used to derive the true shape of the mask feature. This methodology can include building a lookup table from information derived from a test reticle. Specifically, this test reticle can provide data points (i.e. actual host shapes) corresponding to the inspected host shapes. Therefore, by using host image 214, an actual shape can be obtained or interpolated from the data points in such a lookup table.

Analyzing the Defect Image

In accordance with another feature of the invention, the transmission, phase, and shape of the defect in defect image 204 can be computed in steps 205, 206, and 207, respectively. Note that these steps are also independent from each other and therefore can be done in any order.

In one embodiment, the transmission of the defect can be extracted from the surrounding data. Specifically, the defect can be assumed to have the same transmission as the immediate area surrounding the defect. Therefore, a visual inspection of test image 203 can be performed to determine the transmission of the immediate area surrounding the defect, wherein such transmission will also be deemed to be that of the defect.

The phase of the defect can be obtained either computationally or heuristically. In the computational method, an inspection tool can capture at least two test images at different defocus settings. Thus, test image 203 could include multiple test images, each obtained from the inspection tool at a different defocus setting. In one embodiment, graphs similar to graph 410 (FIG. 4) could be generated for defect image 204 at various cut lines, thereby providing approximate information regarding the phase of the defect.

In another embodiment, which yields more accurate phase information, defect image 204 can be modeled as a three-dimensional (3D) object, which can have multiple focus planes. This modeling is described in an article entitled, "Phase Retrieval from Defocused Images and Its Applications in Lithography", R. M. von Bunau et al., Jpn. J. Appl. Phys., Vol. 36, pp. 7494–7498 (1997), which is incorporated by reference herein. As described in this article, the exact phase can be calculated from interference patterns that were captured at multiple defocus settings.

In the heuristic method, certain processes can be evaluated, wherein such evaluation can be used to improve phase assignment of the defect. These processes could include, for example, the coating of the photoresist on the mask, the dry etching of the mask, and the wet etching of the mask. For instance, a 180 degree shifter is usually generated by a dry etch followed by a wet etch. Defects caused by photoresist material at the dry etching step or the wet etching step will cause different, but known phase defects on the wafer.

In one embodiment, the shape of the defect can be computed using the same diffraction compensation used for host image 314. Specifically, the inspection optics acts as a function F on the defect, wherein the function F generates defect image 204. Therefore, an inverse function F' and defect image 204 can be used to derive the true shape of the defect. This methodology can include building a lookup table from information derived from a test reticle. Specifically, this test reticle can provide data points (i.e. actual defect shapes) corresponding to the inspected defect shapes. Therefore, using defect image 204, an actual shape can be obtained or interpolated from the data points in such a lookup table. Note that this computation can be more complicated for larger defects than for smaller defects. In other words, for larger defects, some interference can occur at the edges of the defect, wherein interference typically does not occur in the middle of the defect. Thus, large defects can exhibit more distortions in defect image 204 than small defects. Diffraction compensation advantageously considers such distortions in its computation.

Analyzing the Reference Image

In accordance with yet another feature of the invention, the transmission (i.e. the intensity transmission coefficient) and phase of the shifters in reference image 213 can be computed in steps 245 and 246, respectively. These steps are independent from each other and therefore can be done in any order. Note that the transmission and phase information for reference image 213 can be provided by database 211, assuming information from database 211 is available. For purposes of illustration herein, information from database 211 is assumed to be unavailable, thereby necessitating the derivation of transmission and phase information from reference image 213.

In one embodiment, the transmission of one or more shifters can be derived from a gray scale of reference image 213. The transmission coefficient of various transmission areas can be obtained from a lookup table, which stores the gray scale information. An approximate phase of each high transmission area can also be derived from the gray scale. Specifically, a gray scale of reference image 213 can be plotted along a cut line, wherein high intensity areas with/without bumps can identify the approximate phase (i.e. 180/0 degrees) of each shifter.

Note that the gray scale generated by an inspection tool may not precisely reflect the transmission or phase of the shifters due to potential differences in optical settings (e.g. wavelength) used by the inspection tool and the stepper (which will transfer the pattern on the mask to the wafer). Therefore, in one embodiment, the gray scale can be calibrated, called a transfer function, in step 240. This step can change the transmissions computed in step 205 for defect image 204, in step 215 for host image 214, and in step 245 for reference image 213. Therefore, step 240 can optimize the corrections made to defect image 204, host image 214, and reference image 213.

The shape of the shifters on the reference image can be computed in step 247 using diffraction compensation. Specifically, the inspection optics act as a function F on a mask feature, wherein the function F generates the reference image. Therefore, an inverse function F' and the reference image can be used to derive the true shape of the mask feature. This methodology can include building a lookup table from information derived from a test reticle. Specifically, this test reticle can provide data points (i.e. actual reference shapes) corresponding to the inspected reference shapes. Therefore, by using reference image 213, an actual shape can be obtained or interpolated from the data points in such a lookup table.

Simulation and Processing of Images

Combining the defect results obtained by steps 205–207 and the host results obtained by steps 215–217, a corrected test image 250 can be generated. Similarly, using the reference results obtained by steps 245 and 246, a corrected reference image 251 can be generated. Referring to FIG. 2B, using corrected test image 250 and corrected reference image 251, a simulation tool can generate a simulated test wafer image 209 in step 208 and a simulated reference wafer image in step 218. In other words, the simulation tool can use defect image 204, host image 214, and reference image 213 as well as the transmission, phase, and shape information for each image to accurately simulate the wafer exposures that masks including the images would provide under a given set of stepper conditions.

In one embodiment, a trim mask image 221 can also be used in steps 208 and 218 to simulate the second exposure in double exposure phase shifting mask technology. Trim mask image 221, which represents part of a trim mask, can indicate areas of wafer images 209/219 that will be protected from exposure as well as areas that will be exposed, thereby defining other features of the layout. Thus, because the trim mask can affect the printability of features defined by the PSM, trim image 221 can improve the accuracy of test wafer image 209 and reference wafer image 219. In one embodiment, trim mask image 221 can be rendered from database 211. Note that, in general, a supplemental mask image can be used in generating test wafer image 209 and reference wafer image 219, thereby simulating another exposure in a multiple exposure phase shifting mask technology. Thus, a trim mask image could be one example of a supplemental mask image.

Further processing of test wafer image 209 and reference wafer image 219 can be performed in step 220 to determine the severity of the defect shown in test wafer image 209, e.g. to output a defect severity score. In one embodiment, the Virtual Stepper system can perform the steps and processes of FIGS. 2A and 2B, including but not limited to computing the transmission, phase, and shape of the defect, host, and reference images (if necessary), simulating the test and reference wafer images, as well as performing the processing in step 220.

Figure 5:
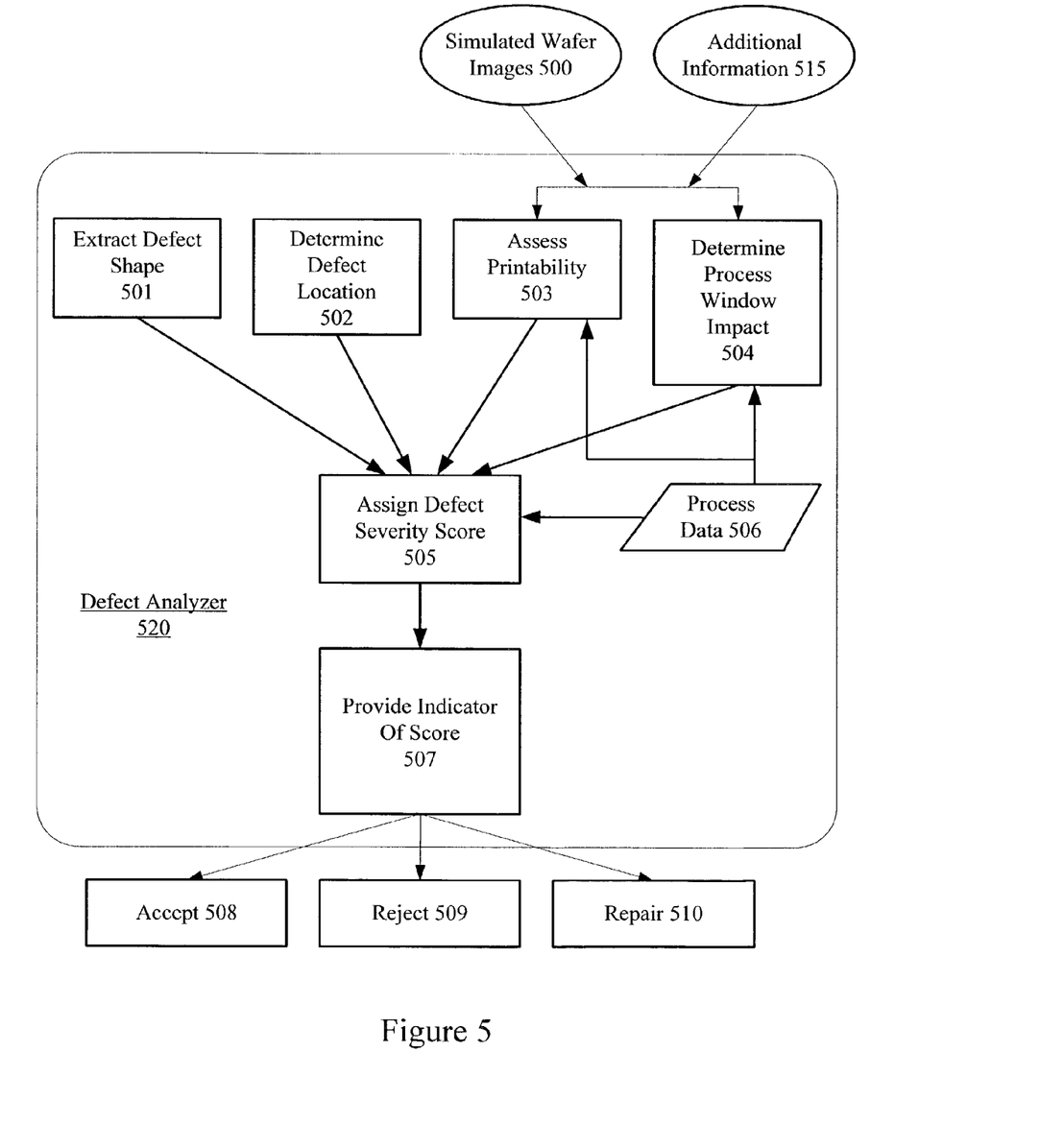
FIG. 5 illustrates a flow chart representing various steps performed by one embodiment of a soft defect analyzer.

FIG. 5 illustrates a flow chart representing various steps performed by one embodiment of a soft, i.e. phase or transmission, defect analyzer. Simulated wafer images 500, such as provided by test wafer image 209 and reference wafer image 219 (both shown in FIG. 2B), can be provided to a defect analyzer 520. In one embodiment, additional information 515, such as files that include the associated phase and transmission "maps" (i.e. distributions) of such images, can also be provided to defect analyzer 520. Defect analyzer 520 can assign a defect severity score to the defect area in step 505. Defect severity scoring is described in U.S. patent application Ser. No. 09/814,023, entitled "System and Method of Providing Mask Defect Printability Analysis", filed on Mar. 20, 2001, and incorporated by reference herein.

Defect analyzer 520 can further provide an indicator of the defect severity score in step 507. This indication, in one embodiment, can trigger a mask "accept" action in step 508, a mask "reject" action in step 509, or a mask "repair" action in step 510. A mask in accordance with the invention can include at least one soft defect that is identified, but determined to be acceptable based on a simulated wafer image including the soft defect.

In one embodiment, the indicator may be a weighted score which takes into account various parameters associated with the phase defect including phase defect shape (as extracted in step 501 (obtained in step 207, see FIG. 2A)), phase defect location (as determined in step 502), the printability of the phase defect (as assessed in step 503 (simulated in step 208, see FIG. 2B)), the process window impact of the phase defect (as determined in step 504 by using computed information from steps 205–207 (FIG. 2A)), and the wafer process data (such as the lithography conditions) 506.

Note that wafer process data 506 may also be used in assessing the printability in step 503 and determining the process window impact of the phase defect in step 504. In one embodiment, each of steps 501–504 can weighted based on user input. Defect analyzer 520 can include storage of defect data, thereby facilitating later processing of the mask. U.S. patent application Ser. No. 09/544,798, entitled "Method and Apparatus for a Network-Based Mask Defect Printability Analysis System", and filed on Apr. 7, 2000, which is incorporated by reference herein, describes using defect analyzers in further detail.

A system for implementing soft defect identification and severity determination can include a computer and a tool running on the computer. The tool can include means for obtaining a test image from the mask (the test image including a defect), means for obtaining a reference image (the reference image providing a defect-free image of the test image), means for generating a defect image from the test image and the reference image, means for generating a host image from the test image and the defect image, and means for computing a transmission, a phase, and a shape of the defect image and the host image. The tool can further include means for simulating wafer images of the defect image and the host image based on the computed transmissions, phases, and shapes. The tool can be used in a manufacturing environment for on-line mask inspection, for off-line mask review, and for mask repair. In one embodiment, the tool can be used in a wafer fabrication facility for diagnosing line problems.

OTHER EMBODIMENTS

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent.

For example, if neither database nor gray scale information is available, then certain arbitrary phase assignments to the shifters can be made in the host image. Specifically, assuming that no phase conflicts exist in the host image, a first shifter can be assigned one phase (e.g. 0 degrees). At this point, using the assigned phase from the first shifter, a second shifter proximate to the first shifter can be assigned the opposite phase (e.g. 180 degrees). Note that proximate shifters typically define sub-wavelength features (e.g. a transistor gate) and therefore have opposite phases. In other words, the proximity of the shifters can indicate a desired feature size and, by extension, the assignment of opposite phases to such shifters to achieve that desired feature size. Because the accuracy of the assignment of a particular phase to each shifter would still be uncertain, one embodiment of the invention can include computing the worse case scenario.

In another embodiment where defocus information is unavailable, then an assumed phase can be assigned to the defect based on its defect type. Specifically, certain types of defects may have a high probability of being certain phases. This information can be used in the assignment of phase to a defect in an image.

In another embodiment, the defect and host images can include both reflection mode and transmission mode images. In this embodiment, the reflection mode images can be used to detect, isolate, and classify the phase defects (steps 205–207 and 215–217), whereas the transmission mode images can be used in simulation (steps 208 and 218). Specifically, because the light passes through a mask twice in the reflection mode, the phase difference can be augmented on the test image. Therefore, the reflected image can provide a better means to calculate phase compared to the transmitted image. In yet another embodiment, the reference image can be obtained using a reconstruction methodology.

In yet another embodiment, the identification and severity determination of phase defects can be extended to various types of PSMs. Specifically, these techniques can be applied to any one of alternating PSMs (shown in FIGS. 1A–1C), attenuated PSMs, and tri-tone attenuated PSMs. An attenuated PSM is formed by attenuated, phase-shifting regions formed on clear regions. The clear regions are transparent, i.e. regions having an optical intensity transmission coefficient T>0.9, whereas the attenuated, phase-shifting regions are partially transparent, i.e. regions typically having a low optical intensity transmission coefficient 0.03<T<0.1. A tri-tone attenuated PSM is formed by attenuated, phase-shifting regions formed on clear regions as well as opaque regions formed on the attenuated, phase-shifting regions. The clear regions are transparent, i.e. regions having an optical intensity transmission coefficient T>0.9, the attenuated, phase-shifting regions are partially transparent, i.e. regions having a low optical intensity transmission coefficient 0.3<T<0.9, and the opaque regions are not transparent, i.e. having an intensity transmission coefficient of T<0.01.

In yet another embodiment, the identification and severity determination of phase defects can be extended to binary masks. Although phase defects are not initially present on a binary mask (that is, the exposed quartz would not be etched and therefore would have a uniform phase of 0 degrees), such phase defects can be created during repair operations. Specifically, the repair of an area on a mask that is erroneously covered with chrome entails the removal of such chrome. This operation is mechanically, not chemically, performed. Therefore, potentially some portion of the exposed quartz surface could be removed, thereby resulting in a phase defect on the repaired mask. Phase defect identification and severity determination can advantageously determine whether the repaired binary mask should be accepted or rejected.

Moreover, the impact of phase defects on OPC features in a repaired binary mask can be extremely difficult for test engineers to assess. In other words, a phase defect on a hammerhead, serif, or other OPC feature may not significantly impact the wafer printability. Therefore, an automated soft defect methodology can provide an objective and accurate determination as to a defect's impact on printability.

Further note that the methods described herein can be applied to any lithographic process technology, including ultraviolet, deep ultraviolet (DUV), extreme ultraviolet (EUV), x-ray, electron projection lithography (EPL), and ebeam. Accordingly, it is intended that the scope of the invention be defined by the following Claims and their equivalents.

The invention claimed is:

1. A method of inspecting a mask, the method including:
    obtaining a test image from the mask, wherein the test image includes a defect;
    computing a transmission, a phase, and a shape of the defect; and
    generating a simulated test wafer image based on the computing associated with the defect;
    obtaining a reference image, wherein the reference image provides a defect-free image of the test image;
    generating a defect image by subtracting the reference image from the test image, wherein computing the transmission, the phase, and the shape of the defect uses the defect image;
    generating a host image by subtracting the defect image from the test image;
    computing a transmission, a phase, and a shape of the host image; and
    generating a corrected test image based on the computing associated with the host image and the defect image, wherein generating the simulated test wafer image uses the corrected test image.

2. The method of claim 1, wherein obtaining the reference image includes at least one of rendering the reference image from a database, inspecting a die image, and reconstructing the reference image.

3. The method of claim 1, further including:
    computing a transmission, a phase, and a shape of the reference image;
    generating a corrected reference image based on the computing associated with the reference image; and
    generating a simulated reference wafer image based on the computing associated with the reference image.

4. The method of claim 3, further including:
processing the simulated test wafer image and the simulated reference wafer image to determine an impact of the defect.

5. The method of claim 1, further including:
calibrating the transmission of at least one of the defect, the host, and the reference images.

6. The method of claim 1, wherein computing the shape of the defect includes:
using diffraction compensation to correct for optical distortions in the defect image.

7. The method of claim 1, wherein computing the phase of the host image includes:
analyzing gray scale intensities along a cut line on the host image; and
identifying locations of high intensities, wherein bumps at the locations indicate approximately a 180 degree phase and no bumps at the locations indicate approximately a 0 degree phase.

8. The method of claim 1, wherein computing the phase of the defect includes:
generating multiple defect images, each defect image taken at a different defocus.

9. The method of claim 1, wherein computing the transmission of the defect includes:
determining a first transmission of an area immediately surrounding the defect using the test image; and
assigning the defect the first transmission.

10. The method of claim 1, wherein computing the transmission of the host image includes:
using a lookup table including gray scale intensities.

11. The method of claim 1, wherein if the mask is a phase shifting mask, then further including:
using a supplemental mask image in generating the simulated test wafer image.

12. A system for generating an accurate simulation image for a phase shifting mask, the system comprising:
a computer; and
a tool running on the computer, the tool including:
means for obtaining a test image from the phase shifting mask, wherein the test image includes a defect;
means for obtaining a reference image, wherein the reference image provides a defect-free image of the test image;
means for generating a defect image from the test image and the reference image;
means for generating a host image from the test image and the defect image;
means for computing a transmission, a phase, and a shape of the defect image and the host image;
means for providing a corrected test image based on the transmission, the phase, and the shape of the defect image and the host image; and
means for simulating a test wafer image based on the corrected test image.

13. A method for determining an impact of a soft defect on wafer printability, the method comprising:
obtaining a test image from a mask, wherein the test image includes the soft defect;
obtaining a reference image, wherein the reference image provides a defect-free image of the test image;
generating a defect image from the test image and the reference image;
generating a host image from the test image and the defect image;
computing a transmission, a phase, and a shape of the defect image, the host image, and the reference image;
generating a corrected test image and a corrected reference image based on the computing;
simulating a test wafer image and a reference wafer based on the corrected test image and the corrected reference image, respectively; and
assigning a defect severity score based on the simulated wafer test wafer image and the simulated reference wafer image.

14. The method of claim 13, further including providing an indicator based on the defect severity score, the indicator representing one of accepting the mask, rejecting the mask, and repairing the mask.

15. The method of claim 13, wherein the mask is one of a binary mask, an alternating phase shifting mask, an attenuated phase shifting mask, and a tri-tone attenuated phase shifting mask.

16. The method of claim 13, wherein the mask is a repaired binary mask.

17. The method of claim 13, wherein the soft defect includes one of a phase defect and a transmission defect.

18. The method of claim 13, wherein computing the phase includes referring to a gray scale associated with at least one of the defect image, the host image, and the reference image.

* * * * *